Figure 1:
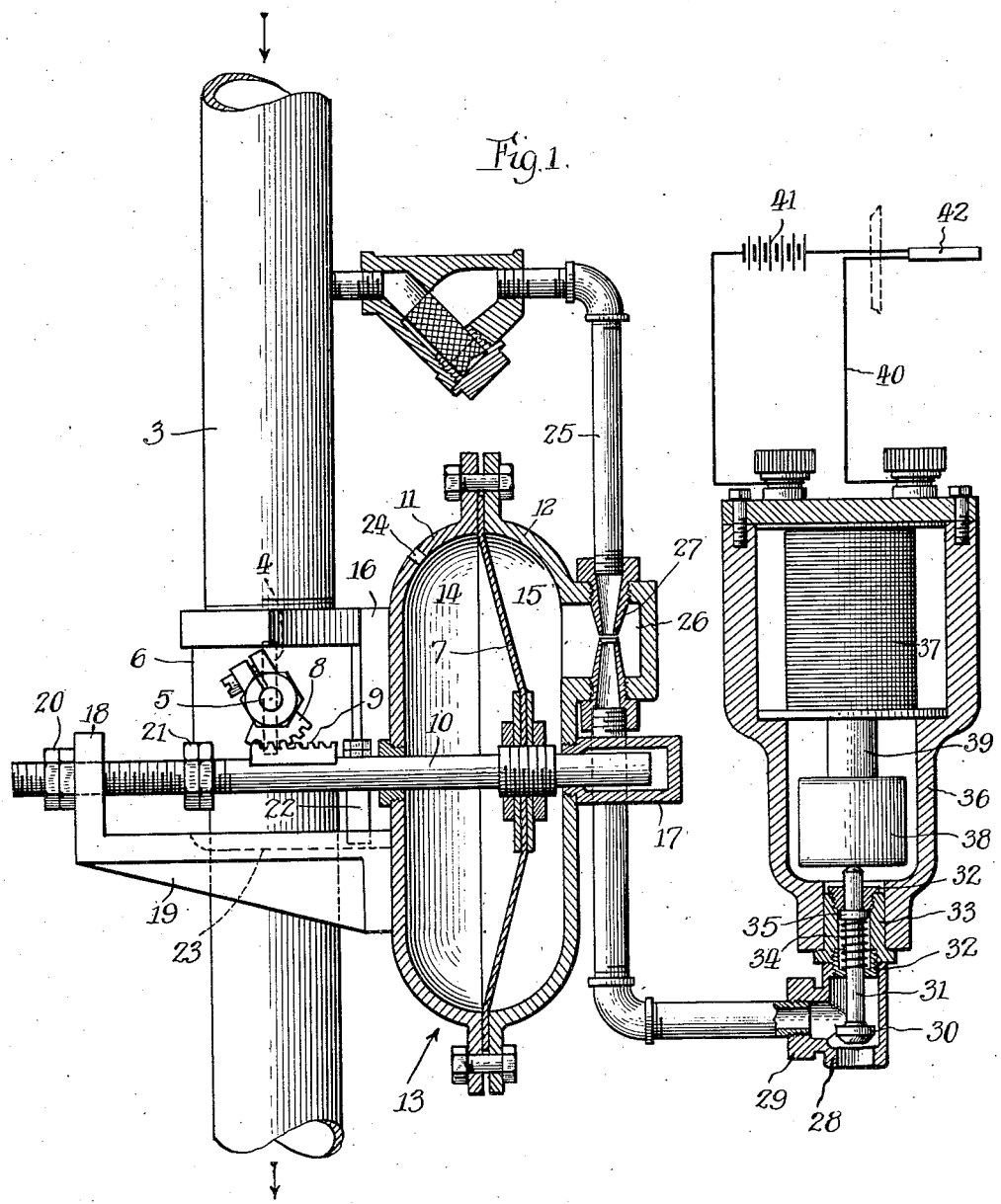

Oct. 28, 1930.  G. W. McKEE  1,779,978
CONTROL DEVICE
Filed April 19, 1928   2 Sheets-Sheet 1

Inventor:
Garnet W. McKee,
By Churdahl Parker Carlson
Attys.

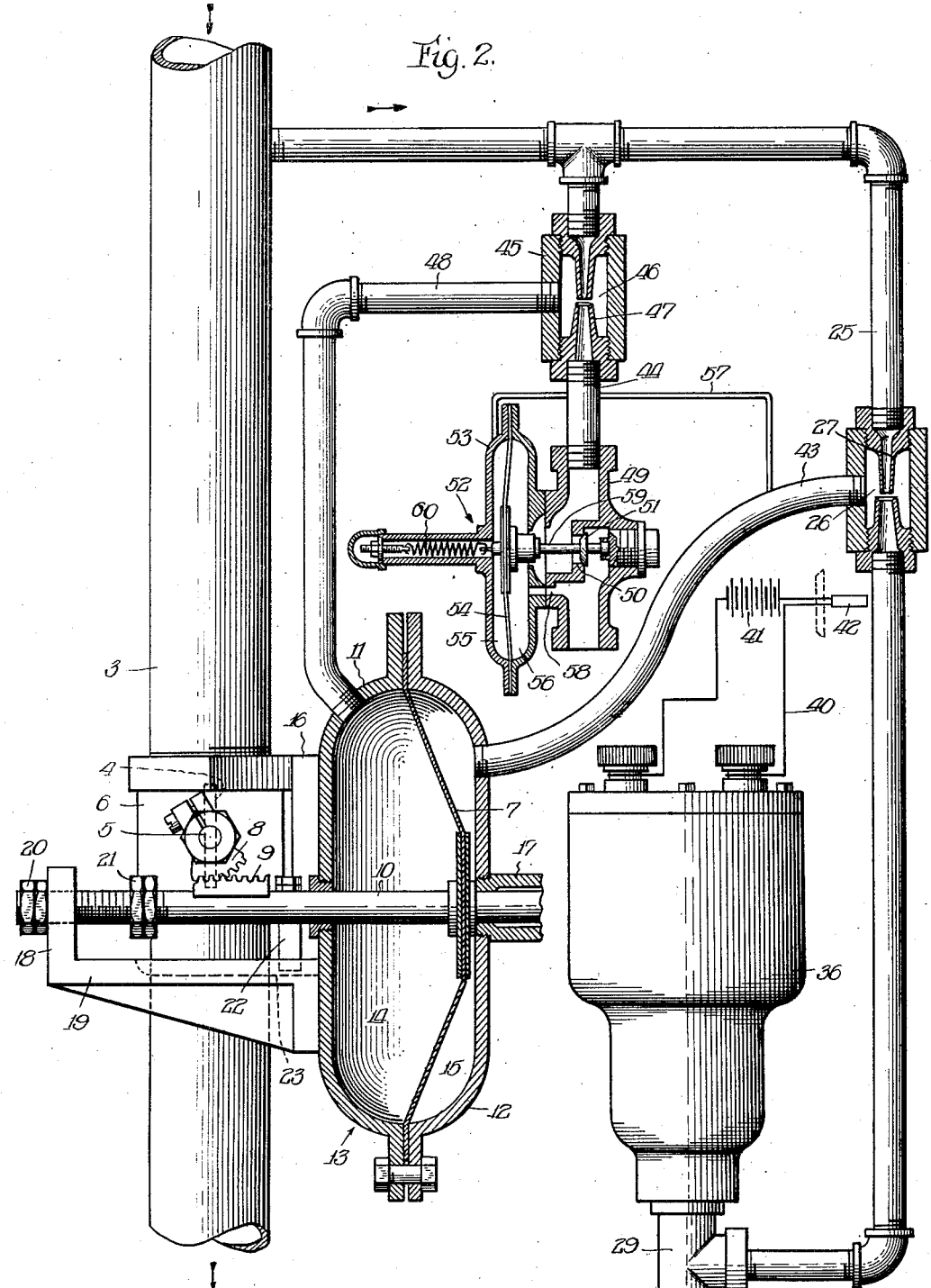

Patented Oct. 28, 1930

1,779,978

UNITED STATES PATENT OFFICE

GARNET W. McKEE, OF ROCKFORD, ILLINOIS

CONTROL DEVICE

Application filed April 19, 1928. Serial No. 271,257.

The present invention relates to improvements in control devices for regulating the flow of fluids, and more particularly to devices, such as is disclosed in my copending application Serial No. 96,407 filed March 22, 1926 (Patent No. 1,752,534), for automatically regulating the flow of air, fuel or both to a burner in accordance with temperature variations at the burner, the device being designed to increase the flow upon a decrease in the temperature and to decrease the flow upon an increase in temperature, from a predetermined point.

In the control device disclosed in said copending application, the flow of fluid is controlled by means of a suitable valve which is operatively connected to a pressure responsive member in a suitable casing. The position of this member is determined by a variable pressure differential, one component of which is adapted to be the pressure of the fluid. In varying the pressure differential, the pressure of the fluid is transmitted to one side of the member to move it into one position, or withheld therefrom or reduced to permit movement of the member by the other component into the other position, all under the control of a suitable temperature responsive means.

The primary object of the present invention resides in the provision of novel means for automatically subjecting one surface of the pressure responsive member to the pressure of the fluid or a suction.

Another object resides in the provision of a bleed line from the fluid line which is adapted to be opened and closed, and which includes a Venturi suction nozzle adapted to create a vacuum at one side of the pressure responsive member when the bleed line is open, and adapted to transmit the pressure of the fluid to the member when the bleed line is closed.

A further object resides in the provision of means for utilizing the pressure of the fluid to exert a push and pull on the pressure responsive member in moving the latter in either direction.

An important object of the invention resides in the provision of two bleed lines from the fluid line, each bleed line including a Venturi suction nozzle, the suction spaces of the nozzles communicating respectively with the chamber at opposite sides of the pressure responsive member, and means for alternately closing and opening the bleed lines to impress a pull and a push on the member in either direction.

Further objects and advantages will become apparent as the description proceeds.

In the accompanying drawings, Figure 1 is an elevational view partly in section of a device embodying the features of my invention.

Fig. 2 is a view similar to Fig. 1 of a modified form of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention illustrated in the drawings, 3 represents a fluid supply pipe or line which is adapted to transmit fluids, such as air, fuel or a mixture of air and fuel, from a source of supply (not shown) to a point for use, such for example as a suitable burner (not shown). In the present instance, it may be assumed that air under pressure, which is to be mixed in a proper proportion with fuel for the burner, flows through the pipe 3 in the direction of the arrows.

Interposed in the supply pipe 3 is a valve 4 which may be of any suitable construction, and which in the present instance is in the form of a butterfly valve. This valve is automatically controlled to reduce the flow of air through the pipe 3 as the temperature at the burner rises above a predetermined point, and to permit a substantial flow of air when said temperature falls below a predetermined point.

The butterfly valve 4 is mounted on a suitable shaft 5, one end of which extends diametrically out of a fitting 6 in the pipe 3. The outer end of the shaft 5 is operatively connected to a suitable pressure responsive member, such as a diaphragm 7. In the present instance, this connection comprises a gear segment 8 secured on the shaft 5, a gear rack 9 meshing with the segment, and a plunger 10 on which the gear rack is mounted, and which is tightly secured to a central part of the diaphragm 7.

The diaphragm 7, which may be of any suitable material, is secured between two opposed sections 11 and 12 of a suitable casing 13, and serves to define therewith a chamber 14 and a chamber 15, respectively. The casing 13 may be mounted on any suitable support, and in the present instance is secured to the fitting 6 by means of a suitable connecting member 16.

The plunger 10 extends slidably through the casing 13, the end remote from the rack 9 being disposed in a closed tubular fitting 17 tightly secured on the outside of section 12. The other end of the plunger 10 extends through an upstanding ear 18 on a bracket 19 conveniently mounted on the casing section 11, and has suitable stop nuts 20 and 21 adjustably threaded thereon in spaced relation and at opposite sides of the ear 18 to limit the extent of reciprocation. A pin 22 depends from the plunger 10 into a notch 23 formed in the bracket 19 to prevent rotation of the plunger.

In Fig. 1, the chamber 14 communicates with the atmosphere through one or more openings 24 formed in the section 11, and the chamber 15 is connected through a small by-pass or bleed pipe 25 to the fluid pipe 3, preferably at the high pressure side of the valve 4. In the present instance, the chamber 15 is connected in the pipe 25 by a small pocket or auxiliary chamber 26, preferably formed integrally with the section 12.

Means is provided for creating a suction in the chamber 26 and the chamber 15 when the temperature at the burner falls below a predetermined point so as to flex the diaphragm 7 into the chamber 15 to open the valve 4, and to transmit the pressure in the pipe 3 to the chamber 26 and chamber 15 when the temperature at the burner rises above a predetermined point so as to flex the diaphragm into the chamber 14 to restrict the flow of fluid through the pipe 3. To this end, a Venturi suction nozzle 27 is interposed in the pipe 25 in the chamber 26, with the constricting portion of the nozzle secured to the inlet of the chamber and with the expanding portion of the nozzle secured to the outlet of the chamber. The free end of the pipe 25 is adapted to communicate with the atmosphere through a suitable valve port 28 formed in a valve fitting 29. A valve member 30 in the fitting 29 is adapted to seat on the valve port 28 to close the latter, and has a valve plunger 31 slidably mounted in spaced nuts 32 secured in opposite ends of a sleeve 33. The lower nut 32 serves to secure the fitting 29 to the sleeve 33. A coil spring 34 disposed on the plunger between the lower nut 32 and a collar 35 on the plunger tends to move the latter upwardly away from the valve port 28.

The sleeve 33 is secured in the lower end of a housing 36 for a solenoid 37, and the upper end of the plunger 31 is adapted to be engaged by a weight 38 on the lower end of the core 39 of the solenoid. It will be evident that excitation of the solenoid 37 will raise the weight 38, thereby permitting opening of the valve port 28, and that deenergization of the solenoid will permit the weight to drop, thereby moving the valve member 30 against the force of the spring 34 to close the valve port 28.

Preferably, the solenoid 37 is connected in series in a circuit 40 including a suitable source of electric current 41 and a thermostatic element 42 adapted to close and open the circuit respectively as the temperature at the burner falls below and rises above a predetermined range.

In operation, when the temperature rises above a predetermined point, the valve port 28 will be closed, thereby stopping the flow through the Venturi suction nozzle 27. As a result, the pressure in the pipe 3 will build up in the chamber 15, and will flex the diaphragm 7 into the chamber 14 so as to move the valve 4 into closed position. If the temperature falls below a pedetemined point, the valve port 28 will be opened, thereby permitting a flow of fluid from the pipe 3 through the pipe 25 and the Venturi suction nozzle 27 to the atmosphere. This flow will produce a partial vacuum in the chamber 15 so that the diaphragm 7 will be flexed from the chamber 14 into the chamber 15 to open the valve 4.

In some instances, where fluid under a relatively low pressure is passing through the pipe 3, the suction created in the chamber 15 may not be strong enough to produce the desired action of the diaphragm 7. Hence, means may be provided for creating a pressure in the chamber 14 when the chamber 15 is under suction, and for creating a suction in the chamber 14 when the chamber 15 is under pressure so as to subject the diaphragm 7 simultaneously to a pull and push in flexing it from one chamber to the other. In Fig. 2, I have shown a suitable means of this character.

The control device shown in Fig. 2 is similar to the device shown in Fig. 1, and hence the corresponding parts are designated by like reference characters. In the modified form of the control device, the auxiliary chamber 26 for the Venturi nozzle 27 is not formed integral with the casing section 12, but is connected thereto by means of a suitable pipe 43. However, the chamber 26 may be cast integral with the casing section 12 if desired.

Instead of a vent 24 to the atmosphere, means is provided for transmitting the pressure in the pipe 3 to the chamber 14, or for creating a suction therein. This means preferably comprises a second by-pass or bleed pipe 44 connected to the pipe 3 through a portion of the pipe 25. Interposed in the pipe 44 is a suitable fitting 45 defining a suitable auxiliary chamber 46 about a venturi 47 similar to the venturi 27. The fitting 45 is connected through a pipe 48 to the casing section 11.

The free end of the pipe 44 is formed with a suitable valve fitting 49 having a valve port 50 opening to the atmosphere. This port 50 is adapted to be opened and closed by a suitable valve member 51 under the control of a zero governor 52. Briefly described, the zero governor 52 preferably comprises a suitable casing 53 divided by a flexible diaphragm 54 into chambers 55 and 56. The chamber 55 communicates through a small bleed pipe 57 with the pipe 43; and the chamber 56 communicates through a passage 58 to the atmosphere. The diaphragm 54 is connected through a suitable plunger 59 with the valve member 51, and a spring 60 suitably anchored in the casing 53 tends to flex the diaphragm 54 in a direction to close the valve port 50.

In operation, if the temperature at the burner falls below a predetermined point, the pipe 25 will be opened to the atmosphere, thereby permitting the flow of fluid from the pipe 3 through the Venturi nozzle 27. This will create a vacuum in the chamber 15, the pipe 43, and the chamber 55. The vacuum in the chamber 55 will cause the valve member 51 to close the valve port 50, thereby preventing a flow of fluid through the Venturi nozzle 47. As a result, the pressure of the pipe 3 will build up in the chamber 14. The pressure in the chamber 14 and the vacuum in the chamber 15 then will exert a push and pull on the diaphragm 7 to flex the latter into the chamber 15 and thereby open the valve 4.

If the temperature at the burner rises above a predetermined point, the bleed pipe 25 will be closed, thereby causing the pressure in the pipe 3 to build up in the chamber 15 and the chamber 55. Pressure in the chamber 55 will move the valve member 51 against the force of the spring 60 to open the valve port 50. As a result, fluid from the pipe 3 will now flow through the Venturi nozzle 47, thereby creating a vacuum in the chamber 14. The vacuum in the chamber 14 and the pressure in the chamber 15 will exert a pull and a push on the diaphragm 7 to flex the latter into the chamber 14 so as to move the valve 4 into its closed position.

It will be evident that I have provided a highly sensitive and efficient control device for automatically regulating the flow of fluid in accordance with predetermined temperature changes. The device is adapted to be used for fluids under a low pressure as well as fluids under a high pressure, and the construction is simple, compact and inexpensive.

I claim as my invention:

1. A control device having, in combination with a fluid supply pipe, a valve for controlling the flow of fluid through said pipe, a casing, a pressure responsive member operatively disposed in said casing and operatively connected to said valve, a bleed line branching from said fluid line, means connecting said bleed line to said casing at one side of said member, a suction nozzle in said means, and means for opening and closing said bleed line.

2. A control device having, in combination with a fluid supply pipe, a valve for controlling the flow of fluid through said pipe, a casing, a pressure responsive member disposed in said casing and operatively connected to said valve, said member defining a separate chamber at each end in said casing, two Venturi nozzles, each having a suction chamber, means connecting said suction chambers respectively to said first mentioned chambers, means connecting said nozzles to a source of pressure fluid, temperature responsive means for opening and closing the passage through one of said nozzles, and means including a governor vented to the chamber connected to said last mentioned nozzle for opening and closing the passage through the other of said nozzles.

3. A control device having, in combination with a fluid supply pipe, a valve for controlling the flow of fluid through said pipe, a casing, a pressure responsive member disposed in said casing and operatively connected to said valve, said member defining a separate chamber at each end in said casing, two suction nozzles, means connecting said nozzles respectively to said chambers, means connecting said nozzles to a source of pressure fluid, means for opening and closing the passage through one of said nozzles, and means controlled by the pressure in said last mentioned nozzle for closing and opening the passage through the other of said nozzles as said first mentioned passage is opened and closed respectively.

4. A control device having, in combination with a main fluid supply pipe, a valve for controlling the flow of fluid through said pipe, a casing, a pressure responsive member operatively disposed in said casing and operatively connected to said valve, a pressure line, a suction nozzle interposed in said pressure line and communicating with said casing at one side of said member, and means beyond said nozzle for opening and closing said pressure line to permit a suction creating flow through said nozzle or to build up pressure in said nozzle.

5. A control device having, in combination with a fluid supply pipe, a valve for controlling the flow of fluid through said pipe, a casing, a pressure responsive member operatively disposed in said casing and operatively connected to said valve, a bleed pipe branching from said fluid pipe, means connecting said bleed pipe to said casing at one side of said member for creating a suction therein upon the flow of fluid therethrough or for transmitting the pressure in said fluid pipe thereto upon discontinuing said flow, and means for opening and closing said bleed pipe.

6. A control device having, in combination with a fluid supply pipe, a valve for controlling the flow of fluid through said pipe, a casing consisting of two sections, a pressure responsive member secured between said sections and operatively connected to said valve, a secondary fluid pipe, a casing in said secondary fluid pipe in communication with said first mentioned casing at one side of said member, a suction creating nozzle in said last mentioned casing, and means for opening and closing said secondary fluid pipe to permit a flow through said nozzle or to confine the pressure of said secondary fluid pipe to said casing.

7. A control device having, in combination with a fluid supply pipe, a valve for controlling the flow of fluid through said pipe, a casing, a pressure responsive member operatively disposed in said casing and operatively connected to said valve, a second casing having an opening in communication with said first mentioned casing at one side of said member, a fluid pressure line opening to said second casing, and having a discharge nozzle in said second casing extending laterally of said opening, a bleed line opening from said second casing, the inlet of said bleed line being disposed across the end of said nozzle, and means for varying the flow of fluid through said bleed line.

8. A control device having, in combination with a fluid supply line, a valve in said line, a casing, a pressure responsive member in said casing, and operatively connected to said valve, said member defining opposed chambers, means for selectively building up pressure or inducing a vacuum in one of said chambers, and means responsive to the condition in said last mentioned chamber for creating the reverse condition in the opposed chamber so as to apply a push and pull to said member in moving same in each direction.

9. A control device having, in combination with a fluid supply line, a valve for controlling the flow of fluid through said line, a casing, a pressure responsive member in said casing and defining opposed chambers at opposite sides thereof, said member being operatively connected to said valve, a secondary fluid line opening from said main fluid line, a suction creating device in said secondary line and communicating with one of said chambers, means beyond said device for opening and closing said secondary line, a branch line opening from said secondary line in front of said device, a suction creating device in said branch line and communicating with the other of said chambers, and automatic means in said branch line beyond said last mentioned device responsive to the pressure in said first mentioned chamber to open and close said branch line.

10. A control device having, in combination with a fluid supply pipe, a valve for controlling the flow of fluid through said pipe, a casing, a pressure responsive member in said casing and defining opposed chambers at opposite sides thereof, said member being operatively connected to said valve, means for varying the pressure in one of said chambers, and means responsive to the pressure in said first mentioned chamber to vary inversely the pressure in the other of said chambers.

11. A control device having, in combination with a fluid supply pipe, a valve for controlling the flow of fluid through said pipe, a casing, a pressure responsive members in said casing and defining opposed chambers at opposite sides thereof, said member being operatively connected to said valve, a secondary fluid pipe opening from said main fluid pipe, said secondary pipe having two branches, one connected to each of said chambers, two bleed lines, one opening from each of said branches, two suction inducing devices, one interposed in the connection between each branch and its bleed line and responsive to escaping flow through the bleed line to induce a vacuum in the branch, means for opening and closing one branch, and means responsive to said last mentioned means for opening and closing the other branch in inverse order.

12. A control device having, in combination with a fluid supply pipe, a valve for controlling the flow of fluid through said pipe, a casing, a pressure responsive member in said casing and defining opposed chambers at opposite sides thereof, said member being operatively connected to said valve, means for automatically varying the pressure in one of said chambers, a secondary fluid pipe opening to the other of said chambers, a suction inducing device in said secondary pipe, said device including a bleed line, and being operative upon escaping flow through said bleed line, valve means in said bleed line, and means responsive to the pressure in said one chamber to vary the flow through said bleed line to obtain an inverse relation of pressures in said chambers.

In testimony whereof, I have hereunto affixed my signature.

GARNET W. McKEE.